US009527390B2

(12) United States Patent
Yamazaki et al.

(10) Patent No.: US 9,527,390 B2
(45) Date of Patent: Dec. 27, 2016

(54) ELECTRIC VEHICLE CHARGING SYSTEM

(71) Applicant: MITSUBISHI JIDOSHA KOGYO KABUSHIKI KAISHA, Tokyo (JP)

(72) Inventors: Yasuyuki Yamazaki, Toyokawa (JP); Ryo Shimizu, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 251 days.

(21) Appl. No.: 14/471,993

(22) Filed: Aug. 28, 2014

(65) Prior Publication Data

US 2015/0061605 A1   Mar. 5, 2015

(30) Foreign Application Priority Data

Aug. 29, 2013   (JP) ................................. 2013-177531

(51) Int. Cl.
*H02J 7/04* (2006.01)
*B60L 11/18* (2006.01)
(Continued)

(52) U.S. Cl.
CPC ............ *B60L 11/1811* (2013.01); *B60L 1/003* (2013.01); *B60L 1/02* (2013.01); *B60L 1/14* (2013.01);
(Continued)

(58) Field of Classification Search
CPC ... B60L 11/14; B60L 11/1805; B60L 11/1816; B60L 11/1864; B60L 2210/10; B60L 2210/30; Y02T 10/7005; Y02T 10/7044; Y02T 10/7077
(Continued)

(56) References Cited

U.S. PATENT DOCUMENTS 8,115,455 B2   2/2012 Sellin et al.
8,779,728 B2   7/2014 Zhou
(Continued)

FOREIGN PATENT DOCUMENTS

CN   101606272 A   12/2009
JP   2010-205478 A   9/2010
(Continued)

OTHER PUBLICATIONS

Kinomura Shigeki, Device for Adjusting Battery Temperature, Sep. 16, 2010, Toyota Motor Corp, translation of JP 2010-205478.*

*Primary Examiner* — Edward Tso
*Assistant Examiner* — Aaron Piggush
(74) *Attorney, Agent, or Firm* — Birch, Stewart, Kolasch & Birch, LLP

(57) ABSTRACT

A charging system of an electric vehicle includes a drive battery storing electric power for driving a motor of the electric vehicle, a heater heating the drive battery, an electric power supply device converting electric power supplied from outside the electric vehicle and supplying the electric power to the drive battery or the heater, a contactor activating or deactivating a connection between the drive battery and the electric power supply device, temperature detector detecting a temperature of the drive battery, and controller controlling the contactor and the heater based on the temperature. The controller controls the contactor so as to deactivate the connection and conducts electricity to the heater when the temperature is less than a first predetermined temperature, and controls the contactor so as to activate the connection when the temperature is the first predetermined temperature or greater.

6 Claims, 3 Drawing Sheets

(51) Int. Cl.
*B60L 1/00* (2006.01)
*B60L 1/02* (2006.01)
*B60L 1/14* (2006.01)
*B60L 3/00* (2006.01)
*B60L 11/14* (2006.01)

(52) U.S. Cl.
CPC .............. *B60L 3/0046* (2013.01); *B60L 11/14* (2013.01); *B60L 11/1805* (2013.01); *B60L 11/1816* (2013.01); *B60L 11/1862* (2013.01); *B60L 11/1864* (2013.01); *B60L 11/1868* (2013.01); *B60L 11/1875* (2013.01); *B60L 11/1879* (2013.01); *B60L 2210/10* (2013.01); *B60L 2210/30* (2013.01); *B60L 2240/545* (2013.01); *B60L 2240/547* (2013.01); *B60L 2260/22* (2013.01); *Y02T 10/70* (2013.01); *Y02T 10/7005* (2013.01); *Y02T 10/7044* (2013.01); *Y02T 10/7061* (2013.01); *Y02T 10/7066* (2013.01); *Y02T 10/7072* (2013.01); *Y02T 10/7077* (2013.01); *Y02T 10/7216* (2013.01); *Y02T 10/7241* (2013.01); *Y02T 90/127* (2013.01); *Y02T 90/14* (2013.01)

(58) Field of Classification Search
USPC .......................................... 320/104, 150, 163
See application file for complete search history.

(56) References Cited

U.S. PATENT DOCUMENTS

| | | |
|---|---|---|
| 2010/0090659 A1 | 4/2010 | Sellin et al. |
| 2010/0273080 A1* | 10/2010 | Noguchi ............. B60L 11/1881 429/442 |
| 2011/0248684 A1* | 10/2011 | Zhou .................. B60L 11/1809 320/150 |
| 2012/0318783 A1 | 12/2012 | Kamachi |
| 2013/0193920 A1 | 8/2013 | Dickerhoof et al. |

FOREIGN PATENT DOCUMENTS

| | | |
|---|---|---|
| JP | 2011-238428 A | 11/2011 |
| JP | 2012-44813 A | 3/2012 |
| JP | 2012-85481 A | 4/2012 |
| WO | WO 2011/127319 A1 | 10/2011 |
| WO | WO 2012/049559 A2 | 4/2012 |

* cited by examiner

ELECTRIC VEHICLE CHARGING SYSTEM

BACKGROUND

The present invention relates to a charging system for an electric vehicle.

In electric vehicles such as electric vehicles or plug-in hybrid vehicles, configuration is such that an alternating current (AC) electric power supplied from outside the vehicle is converted to a direct current (DC) electric power using a charger provided inside the vehicle, and the DC electric power is charged in a high voltage drive lithium ion battery inside the vehicle (a charging system).

Patent Document 1: JP-A-2011-238428
Patent Document 2: JP-A-2012-044813
Patent Document 3: JP-A-2010-205478
Patent Document 4: JP-A-2012-085481

SUMMARY

One of advantageous aspects of the invention is to provide a charging system of an electric vehicle that prohibits charging of a battery in a temperature state unsuitable for charging, and that implements charging after the battery has been heated to a temperature suitable for charging.

According to a favorable aspect of the invention, a charging system of an electric vehicle, includes:

a drive battery which stores electric power for driving a motor of the electric vehicle;

a heater which heats the drive battery;

an electric power supply device which converts electric power supplied from outside the electric vehicle and supplies the electric power to the drive battery or the heater;

a contactor which activates or deactivates a connection between the drive battery and the electric power supply device;

temperature detector which detects a temperature of the drive battery; and controller which controls the contactor and the heater based on the temperature detected by the temperature detector, wherein the controller controls the contactor so as to deactivate the connection and conducts electricity to the heater when the temperature of the drive battery is less than a first predetermined temperature, and controls the contactor so as to activate the connection when the temperature of the drive battery is the first predetermined temperature or greater.

The electric vehicle charging system may be configured so as to further include:

an auxiliary battery which supplies electric power to the heater; and a charge amount detector which detects a charge amount of the auxiliary battery, wherein the electric power supply device includes:

a charger which converts the electric power supplied from outside the electric vehicle and supplies the converted electric power to the drive battery; and a voltage convertor which is connected to the charger, which converts voltage of the electric power converted by the charger, and which supplies the voltage to the auxiliary battery, wherein the heater includes plural heaters which can be activated or deactivated individually, or includes a variable resistance heater, so as to change heater output; and the controller changes the heater output according to the charge amount of the auxiliary battery.

The controller may increase the heater output as the charge amount of the auxiliary battery increases.

The electric vehicle charging system may be configured so as to further include:

an electrical component supplied with electric power from the auxiliary battery, wherein the controller determines operation or non-operation of the electrical component according to the charge amount of the auxiliary battery.

The controller may be configured so as to allow operation of the electrical component when the charge amount of the auxiliary battery is a predetermined charge amount or greater, and to prohibit operation of the electrical component when the charge amount of the auxiliary battery is lower than the predetermined charge amount.

The controller may determine whether to conduct, or stop, electricity to the heater, and may also determine operation or non-operation of the electrical component according to the temperature of the drive battery.

The controller may be configured so as to:

conduct electricity to the heater and prohibit operation of the electrical component when the temperature of the drive battery is lower than a first predetermined temperature, conduct electricity to the heater and allow operation of the electrical component when the temperature of the drive battery is the first predetermined temperature or greater and also lower than a second predetermined temperature which is higher than the first predetermined temperature, and stop the heater and allow operation of the electrical component when the temperature of the drive battery is the second predetermined temperature or greater.

BRIEF DESCRIPTION OF DRAWINGS

FIG. 3A is a graph explaining heater output against auxiliary battery voltage, and FIG. 3B is a drawing explaining relay operation instructions for heater output.

DETAILED DESCRIPTION OF EXEMPLIFIED EMBODIMENTS

It is not preferable for a high voltage drive lithium ion battery (hereafter referred to as a drive battery) to flow a current therein when at an extremely low temperature state (such as a temperature state of less than −30° C.). This is because when a lithium ion cell employed as the drive battery is charged at an extremely low temperature, the lithium ions from the positive electrode are less liable to be absorbed by the negative electrode, deposit of lithium metal is liable to occur, and issues such as short circuiting may arise.

A charging system is thereby set so as to not operate (charging is prohibited) in cases in which the minimum cell temperature of plural electric cells that configure a drive battery is less than −30° C., such that the drive battery cannot be charged. In other words, the drive battery cannot be charged in an environment of less than −30° C.

When charging the drive battery from outside the vehicle, such as from a household AC outlet, it is therefore recommended that, in an environment of less than −30° C., the drive battery is first heated, and that charging is begun after the drive battery has at least reached a low temperature state (such as a temperature state from approximately −30° C. to 0° C.).

A configuration for heating a battery without greatly changing the existing vehicle configuration is desirable. Moreover, it is desirable to use auxiliary electric power of the electric power source of an electrical component when heating the drive battery, while interrupting the high voltage circuit for charging the drive battery.

Explanation follows regarding an embodiment of a charging system of an electric vehicle according to an example of the invention, with reference to FIGS. 1 to 3B.

Figure 1:
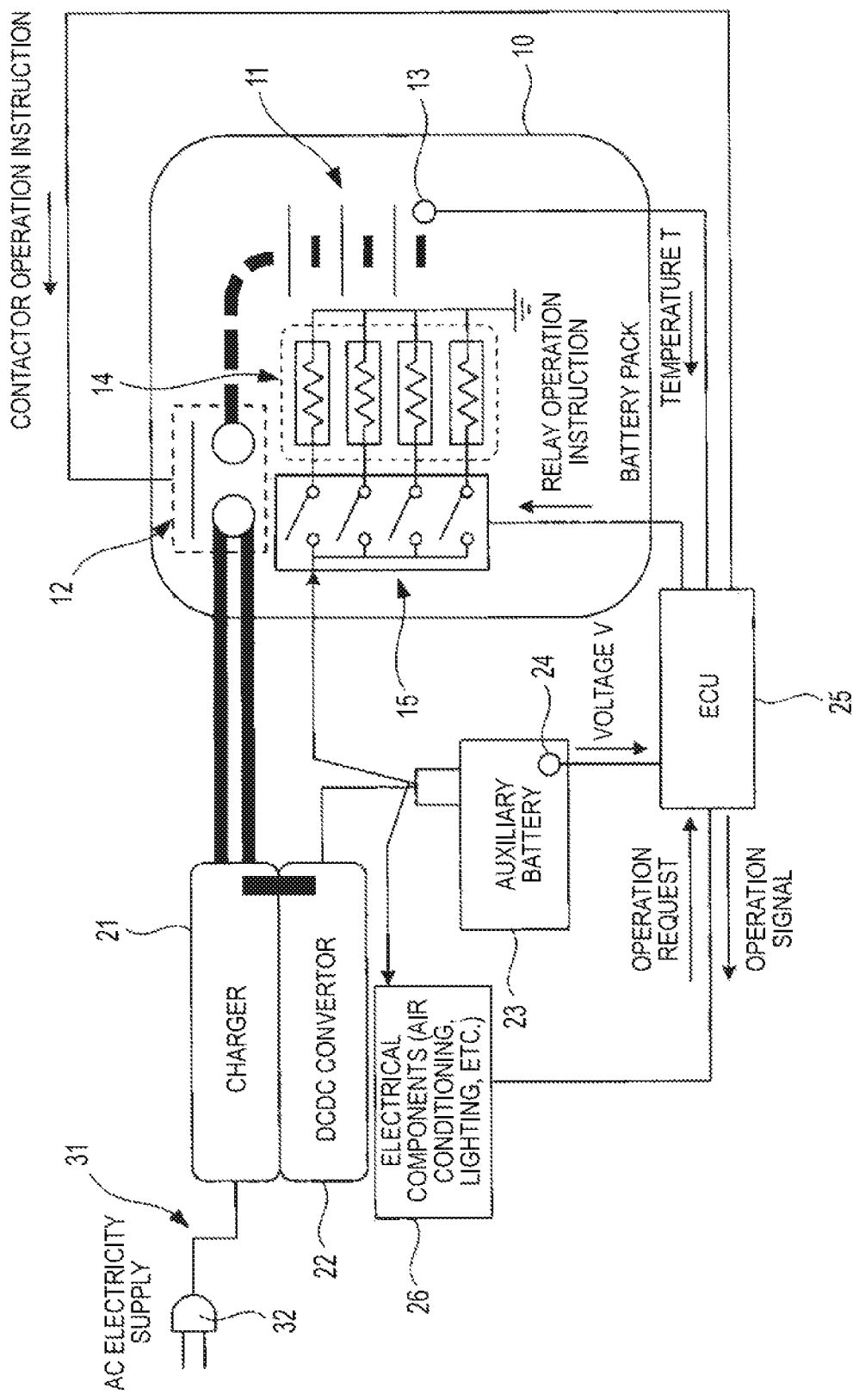
FIG. 1 is a configuration diagram illustrating an example of an embodiment of a charging system of an electric vehicle according to the present invention.
Figure 2:
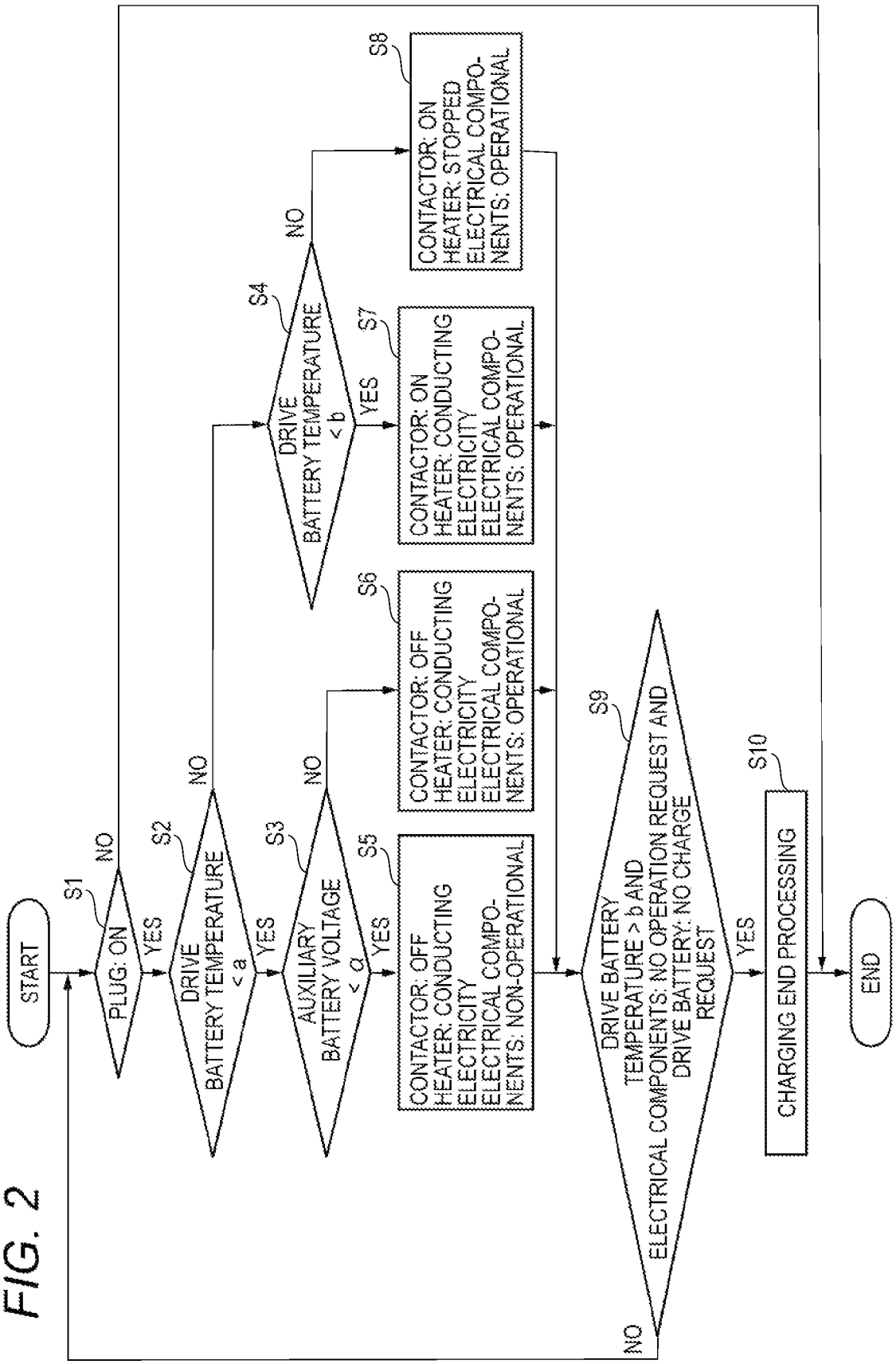
FIG. 2 is a flow chart explaining an example of control implemented in the charging system of the electric vehicle illustrated in FIG. 1.
Figure 3A:
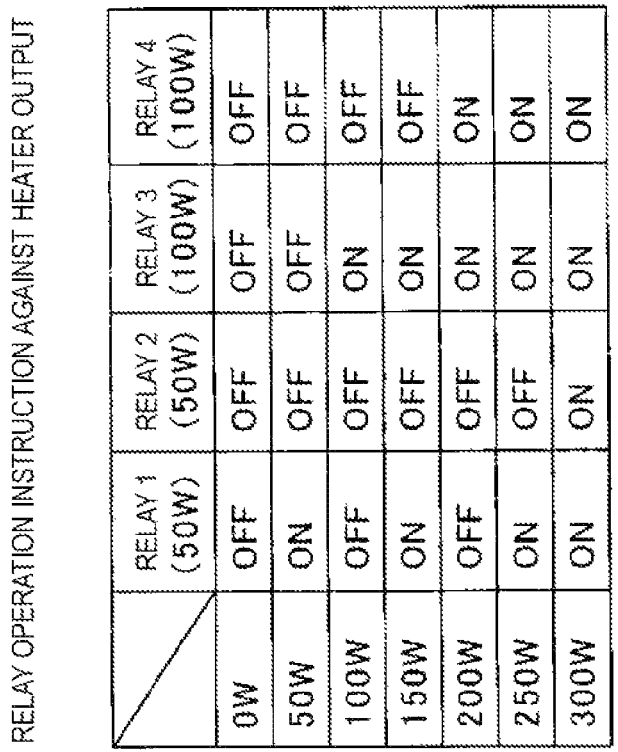
FIGS. 3A and 3B are drawings explaining control implemented in the charging system of the electric vehicle illustrated in FIG. 1.
Figure 3B:
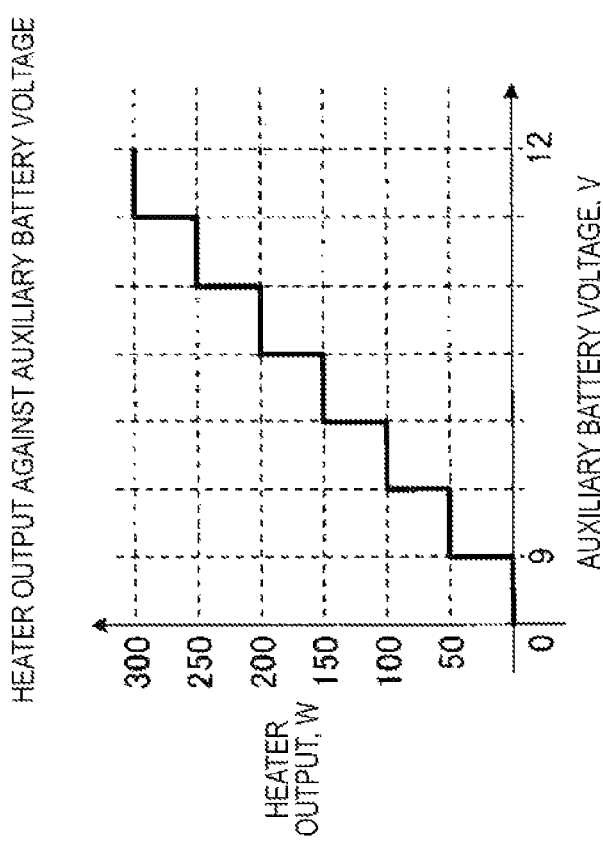

FIG. 1 is a configuration diagram illustrating the charging system of the electric vehicle of the embodiment. FIG. 2 is a flow chart explaining an example of control implemented in the charging system of the electric vehicle illustrated in FIG. 1. FIG. 3A and FIG. 3B are drawings explaining control implemented in the charging system of the electric vehicle illustrated in FIG. 1. FIG. 3A is a graph explaining heater output against auxiliary battery voltage, and FIG. 3B is a drawing explaining relay operation instructions for heater output.

Although in the embodiment an electric vehicle, a plug-in hybrid vehicle, or the like with a high voltage drive lithium ion battery may be applied as an electric vehicle, the explanation below is based on an electric vehicle.

Explanation of the embodiment follows in which an extremely low temperature state is defined as a temperature state of less than −30° C., a low temperature state is defined as a temperature state of −30° C. or more, but less than 0° C., and a normal temperature state is defined as a temperature state from 0° C. to 60° C. The extremely low temperature state is a temperature state that is not suitable for charging a drive battery 11.

The charging system of the electric vehicle of the embodiment is equipped with a battery pack 10 including the high voltage drive lithium ion battery (hereafter referred to as drive battery) 11 which stores electric power for driving an electric motor (non-illustrated) of the electric vehicle. The battery pack 10 is provided with a contactor 12 which controls a connection (activated or deactivated) between the drive battery 11 and a charger 21 described below, a temperature sensor (a temperature detector) 13 which detects the temperature of the drive battery 11, a heater unit 14 which is formed of plural heaters that heat the drive battery 11, and a relay unit 15 which is formed of plural relays corresponding to the individual heaters, and which activates or deactivates the individual heaters.

The charging system of the electric vehicle of the embodiment is provided with the charger 21 which converts AC electric power supplied from the vehicle outside to DC electric power that is supplied to the drive battery 11. The charger 21 is connected to the drive battery 11 through the contactor 12.

When charging the drive battery 11 using electric power supplied from the vehicle outside (hereafter referred to as external charging), for example, a plug 32 of a charge cable 31 for an electric vehicle is inserted into an outlet port of an external electric power source, and AC electric power is supplied from the external electric power source to the charger 21. The charger 21 converts the supplied electric power to a high voltage DC voltage (hereafter referred to as high DC voltage) which is then output. However, when the contactor 12 is activated, the drive battery 11 is supplied with the converted high DC voltage and charged. The charger 21 converts, for example, AC 100V supplied from a household electric power source serving as an external electric power source to a DC 300V high DC voltage, which is then output.

The charging system of the electric vehicle of the embodiment is also provided with a DCDC convertor (voltage convertor) 22 which is connected to the charger 21, which converts high DC voltage converted by the charger 21 to low voltage DC voltage (hereafter referred to as low DC voltage) for supply, and an auxiliary battery 23 which is supplied with the low DC voltage converted by the DCDC convertor 22 and charged. A voltage sensor (charge amount detector) 24, which detects the charge state (charge amount) is provided to the auxiliary battery 23. The DCDC convertor 22 converts, for example, DC 300V high DC voltage to DC 12V low DC voltage, which is then output.

When charging the auxiliary battery 23 from the vehicle outside, the DCDC convertor 22 converts high DC voltage supplied from the charger 21 to low DC voltage, which is then supplied to the auxiliary battery 23. Note that at times other than when charging from the vehicle outside, the DCDC convertor 22 may also convert high DC voltage supplied from the drive battery 11 to low DC voltage, and supply this to the auxiliary battery 23. Namely, the source supplying high DC voltage to the DCDC convertor 22 may be switched. For example, a convertor (non-illustrated) for switching the supply source may be provided, and the supply source may be switched to the charger 21 when charging is being performed from the vehicle outside.

Note that an electric power supply apparatus of the present invention is configured by the charger 21 and the DCDC convertor 22, configured to enable electric power supplied from the vehicle outside to be converted and supplied to the drive battery 11, the heater unit 14, and the like. The electric power supply apparatus (the charger 21 and the DCDC convertor 22) may be configured as a single unit as illustrated in FIG. 1, or may be configured as separate independent units. A lead battery or the like, for example, which has no trouble charging or discharging in an extremely low temperature state, is desirable as the auxiliary battery 23.

The charging system of the electric vehicle of the embodiment is provided with an ECU (Electronics Control Unit; controller) 25, and control, described below, is performed by the ECU 25. For example, the ECU 25 controls the contactor 12, the relay unit 15, and also electrical components 26 provided to the electric vehicle, such as air conditioning equipment and lighting, based on a temperature T from the temperature sensor 13 of the drive battery 11, and a voltage V from the voltage sensor 24 of the auxiliary battery 23. Electric power stored in the auxiliary battery 23 is supplied to operate the ECU 25 when this is performed, and is also supplied when a heater of the heater unit 14, or electrical components 26, or the like are in operation.

Explanation follows regarding an example of control implemented by the charging system of the electric vehicle of the embodiment, with reference to FIG. 1 and the flow chart illustrated in FIG. 2.

Step S1

A check is made as to whether or not the plug 32 of the charge cable 31 is inserted into an outlet port of an external electric power source. Processing proceeds to step S2 if inserted (Plug: ON), and processing is ended if not inserted. Insertion or non-insertion of the plug 32 may be determined, for example, by the ECU 25 detecting whether or not AC electric power is being supplied to the charger 21.

The charger 21 and the DCDC convertor 22 are activated by inserting the plug 32 of the charge cable 31 into an outlet port of an external electric power source, and the auxiliary battery 23 is charged, if required.

Step S2

The temperature T of the drive battery 11 is detected by the temperature sensor 13, and a check is made whether or not the detected temperature T is less than a pre-defined first predetermined temperature "a". If less than the first predetermined temperature "a", processing proceeds to step S3. If not less than the first predetermined temperature "a", namely, if the detected temperature T is the first predetermined temperature "a" or greater, processing proceeds to step S4. A temperature such as −30° C. is set as the first predetermined temperature "a", to distinguish between the extremely low temperature state and the low temperature state.

Step S3

If the temperature T detected at step S2 is less than the first predetermined temperature "a", the voltage V of the auxiliary battery 23 is detected by the voltage sensor 24, and a check is made whether or not the detected voltage V is less than a pre-defined predetermined voltage α. If less than the predetermined voltage α, processing proceeds to step S5. If not less than the predetermined voltage α, namely, if the detected voltage V is the predetermined voltage α or greater, processing proceeds to step S6. The voltage V is equivalent to a charge state, namely, a charge amount, of the auxiliary battery 23. A voltage corresponding to a charge amount which can be simultaneously supplied to the heater unit 14 and the electrical components 26 is set as the predetermined voltage α (predetermined charge amount). If a 12V battery is employed as the auxiliary battery 23, then the predetermined voltage α is set as 11V, for example.

Step S4

If the temperature T detected at step S2 is the first predetermined temperature "a" or greater, a further check is made whether or not the temperature T is less than a pre-defined second predetermined temperature "b". If less than the second predetermined temperature "b", processing proceeds to step S7. If not less than the second predetermined temperature "b", namely, if the temperature T is the second predetermined temperature "b" or greater, processing proceeds to step S8. A temperature such as 0° C. is set as second predetermined temperature "b", to distinguish between the low temperature state and the normal temperature state.

Step S5

If the temperature T of the drive battery 11 is less than the first predetermined temperature "a", and if the voltage V of the auxiliary battery 23 is less than the predetermined voltage α, the contactor 12 is deactivated, electricity is conducted to the heater unit 14, and the electrical components 26 are made non-operational (operation is prohibited). Namely, if the drive battery 11 is in the "extremely low temperature state" and if the auxiliary battery 23 does not have sufficient charge amount to simultaneously supply the heater unit 14 and the electrical components 26, the contactor 12 is deactivated, and the drive battery 11 is disconnected from the charger 21 such that charging is not performed. The electrical components 26 are then made non-operational, and electricity is conducted to only the heater unit 14 such that the drive battery 11 is heated.

Step S6

If the temperature T of the drive battery 11 is less than the first predetermined temperature "a", and if the voltage V of the auxiliary battery 23 is the predetermined voltage α or greater, the contactor 12 is deactivated, electricity is conducted to the heater unit 14, and the electrical components 26 are made operational (operation is permitted). Namely, if the drive battery 11 is in the "extremely low temperature state" and if the auxiliary battery 23 has sufficient charge amount to simultaneously supply the heater unit 14 and the electrical components 26, the contactor 12 is deactivated, and the drive battery 11 is disconnected from the charger 21 such that charging is not performed. Electricity is then conducted to the heater unit 14 such that the drive battery 11 is heated, and also, if there is a request to operate from an electrical component 26, an operation signal is transmitted to the electrical component 26 such that the electrical component 26 can operate.

Accordingly, at steps S5 and S6, when the drive battery 11 is in the "extremely low temperature state", the drive battery 11 is heated by the heater unit 14, and charging is prohibited (the contactor 12 is deactivated) such that current does not flow to the drive battery 11 unit until the drive battery 11 reaches the "low temperature state".

Moreover, at steps S5 and S6, determination is made whether or not to operate the electrical components 26 according to the charge amount of the auxiliary battery 23. At step S5, since the voltage V of the auxiliary battery 23 is less than the predetermined voltage α, conduction of electricity to the heater unit 14 is prioritized over operation of the electrical components 26, and so operation of the electrical components 26 is not permitted, even if requested. At step S6, since the voltage V of the auxiliary battery 23 is the predetermined voltage α or greater, electricity is not only conducted to the heater unit 14, but the electrical components 26 can also operate.

Step S7

If the temperature T of the drive battery 11 is the first predetermined temperature a or greater, but less than the second predetermined temperature b, the contactor 12 is activated, electricity is conducted to the heater unit 14, and operation of the electrical components 26 is permitted. Namely, if the drive battery 11 is in the "low temperature state", the contactor 12 is activated by a contactor operation instruction, and the drive battery 11 is connected to the charger 21 such that charging is performed. Electricity is then conducted to the heater unit 14 such that the drive battery 11 is heated, and also, if there is a request to operate from an electrical component 26, an operation signal is transmitted to the electrical component 26, such that the electrical component 26 can operate.

At step S7, therefore, when the drive battery 11 is in the "low temperature state", the drive battery 11 is heated by the heater unit 14, and the drive battery 11 is charged. Namely, after the temperature of the drive battery 11 heated by the heater unit 14 has reached the "low temperature state", the contactor 12 is activated, and charging from the charger 21 to the drive battery 11 begins. Not only can electricity be conducted to the heater unit 14, but the electrical components 26 can also operate.

Step S8

If the temperature T of the drive battery 11 is the first predetermined temperature a or greater, and is also the second predetermined temperature b or greater, namely, if the temperature T of the drive battery 11 is the second predetermined temperature b or greater, the contactor 12 is activated, conduction of electricity to the heater unit 14 is stopped, and operation of the electrical components 26 is permitted. Namely, if the drive battery 11 is in the "normal temperature state", the contactor 12 is activated by a contactor operation instruction, and the drive battery 11 is connected to the charger 21 such that charging is performed. Conduction of electricity to the heater unit 14 is then stopped, and heating of the drive battery 11 is stopped. If there is a request to operate from an electrical component 26, an operation signal is transmitted to the electrical component 26, such that the electrical component 26 can operate.

At step S8, therefore, when the drive battery 11 is in the "normal temperature state", since there is no need to heat the drive battery 11, conduction of electricity to the heater unit 14 is stopped, and the drive battery 11 is charged. The electrical components 26 can operate.

Step S9

After implementing one of the above-described steps S5 to S8, checks are made whether or not the temperature T of the drive battery 11 is greater than the second predetermined temperature "b", whether or not there is a request to operate the electrical components 26, and whether or not there is a request to charge the drive battery 11. Processing proceeds to step S10 if the temperature T of the drive battery 11 is greater than the second predetermined temperature "b", there is no request to operate the electrical components 26, and there is no request to charge the drive battery 11. The series of procedures is then ended. However, processing returns to step S1 if any one of the conditions is not satisfied, and the procedures of steps S1 to S9 are repeated.

Step S10

At step S9, processing is then ended if the temperature T of the drive battery 11 is greater than the second predetermined temperature "b", there is no request to operate the electrical components 26, and there is no request to charge the drive battery 11, processing to stop charging is performed at this step. In the processing to stop charging, the contactor 12 is deactivated, the drive battery 11 is disconnected from the charger 21 and charging is stopped.

The contactor 12, the heater unit 14 and the electrical components 26 are thereby controlled according to the temperature T of the drive battery 11. The control contents according to the temperature T of the drive battery 11 are summarized in Table 1 below.

TABLE 1

| Temperature T of drive battery (a < b) | Control contents | | |
|---|---|---|---|
| | Contactor | Heater | Electrical components |
| T < a | OFF | Electricity conducted | Operation prohibited |
| a ≤ T < b | ON | Electricity conducted | Operation permitted |
| b ≤ T | ON | Stopped | Operation permitted |

Note that, "a" and "b" described above may be set as "a"="b". In such a case, for example, control of the middle row of the Table 1 (row a≤T<b) may be omitted.

As described above, control to conduct or stop electricity to the heater unit 14 is performed based on whether the voltage V of the auxiliary battery 23 is less than the predetermined voltage α, or the predetermined voltage α or greater. However, as explained below, the heater output may be variable according to the voltage V (charge amount) of the auxiliary battery 23, by using activation or deactivation control (relay operating instructions) for each of the plural heaters configuring the heater unit 14. Explanation follows regarding such control, with reference to FIGS. 3A and 3B.

Firstly, explanation follows regarding an example of a configuration of the relay unit 15, corresponding to a configuration of the heater unit 14. An example is given in which a heater unit 14 with a maximum heater output of 300 W is provided, with for example two 50 W heaters and two 100 W heaters forming the heater unit 14, and four relays corresponding to the heater forming the relay unit 15 (see FIG. 1).

In the above-described configuration, the ECU 25 controls the heat output from the heater unit 14 according to the voltage V of the auxiliary battery 23. For example, as illustrated in FIG. 3A, if the voltage V is 9.0V or less, the heater output is set to 0 W, and, as illustrated in FIG. 3B, all the relays are deactivated. In such a case, configuration may be made such that charging of the auxiliary battery 23 is prioritized, and low DC voltage is first supplied from the DCDC convertor 22 to the auxiliary battery 23 to make the voltage V of the auxiliary battery 23 exceed 9.0V.

As illustrated in FIG. 3A, the heater output is set to 50 W if the voltage V is greater than 9.0V but 9.5V or less, and, as illustrated in FIG. 3B, for example, a relay 1 corresponding to the heater output of 50 W is activated.

As illustrated in FIG. 3A, the heater output is set to 100 W if the voltage V is greater than 9.5V but 10.0V or less, and, as illustrated in FIG. 3B, for example, a relay 3 corresponding to the heater output of 100 W is activated.

As illustrated in FIG. 3A, the heater output is set to 150 W if the voltage is greater than 10.0V but 10.5V or less, and, as illustrated in FIG. 3B, for example, the relay 1 and the relay 3 corresponding to the heater output of 150 W are activated.

As illustrated in FIG. 3A, the heater output is set to 200 W if the voltage V is greater than 10.5V but 11.0V or less, and, as illustrated in FIG. 3B, for example, the relay 3 and a relay 4 corresponding to the heater output of 200 W are activated.

As illustrated in FIG. 3A, the heater output is set to 250 W if the voltage V is greater than 11.0V but 11.5V or less, and, as illustrated in FIG. 3B, for example, the relay 1, the relay 3 and the relay 4 corresponding to the heater output of 250 W are activated.

As illustrated in FIG. 3A, the heater output is set to 300 W if the voltage V is greater than 11.5V and 12.0V or less, and, as illustrated in FIG. 3B, for example, all the relays corresponding to the heater output of 300 W are activated.

The heater output is accordingly variable in plural patterns, of 0, 50, 100, 150, 200, 250 and 300 W, according to the voltage V (charge amount) of the auxiliary battery 23. The heater output is decreased when the voltage V is low, and the heater output is increased when the voltage V is high, such that an increase in the voltage V is accompanied by an increase in the heater output.

Note that the above-described activation and deactivation of the relays is merely an example, and when the heater output is 100 W, for example, the relay 4 may be activated, or both the relay 1 and the relay 2 may be activated instead of the relay 3.

Instead of the above-described configuration, a configuration may include, for example, six 50 W heaters forming the heater unit 14, and six relays corresponding to the heaters forming the relay unit 15. Furthermore, a variable resistance heater with variable heater output may be disposed instead of the plural heaters capable of individual activation or deactivation.

Note that the above-described relationship between the temperature states (extremely low temperature state, low temperature state, and normal temperature state) and the temperatures ranges is merely an example, and the temperature range settings for each temperature state may be changed according to various conditions.

In the present invention, when the drive battery temperature is lower than the first predetermined temperature (when in the extremely low temperature state), the contactor is deactivated and electricity is conducted to the heater. When the drive battery temperature is the first predetermined temperature or greater, the contactor is activated. Since charging is prohibited in temperature states unsuitable for charging, and battery charging is only implemented after heating the drive battery to a suitable temperature for charging, battery trouble during charging at the extremely low temperature state can be prevented.

In the present invention, the drive battery can be heated by the heater without greatly changing the existing vehicle structure. Moreover, in the present invention, the contactor is deactivated while heating the drive battery using the heater, such that the auxiliary electric power of the electric power source for electrical components can be used, while interrupting the high voltage circuit that charges the drive battery.

The present invention relates to a charging system of an electric vehicle, and in particular to a charging system that can charge a lithium ion battery, even when the electric vehicle is in extremely low temperature environments.

What is claimed is:

1. A charging system of an electric vehicle, comprising:
   a drive battery which stores electric power for driving a motor of the electric vehicle;
   an auxiliary battery which supplies electric power to the heater;
   a charge amount detector which detects a charge amount of the auxiliary battery;
   a heater which heats the drive battery;
   an electric power supply device which converts electric power supplied from outside the electric vehicle and supplies the electric power to at least one of the drive battery and the heater;
   a contactor which activates or deactivates a connection between the drive battery and the electric power supply device;
   a temperature detector which detects a temperature of the drive battery; and
   a controller which controls the contactor and the heater based on the temperature detected by the temperature detector,
   wherein the controller
   controls the contactor so as to deactivate the connection and conducts electricity to the heater when the temperature of the drive battery is less than a first predetermined temperature, and
   controls the contactor so as to activate the connection when the temperature of the drive battery is the first predetermined temperature or greater, and
   wherein the electric power supply device includes:
   a charger which converts the electric power supplied from outside the electric vehicle and supplies the converted electric power to the drive battery; and
   a voltage convertor which is connected to the charger, which converts voltage of the electric power converted by the charger, and which supplies the voltage to the auxiliary battery,
   wherein the heater includes a plurality of heaters which can be activated or deactivated individually, or includes a variable resistance heater, so as to change heater output; and
   the controller changes heater output power according to the charge amount of the auxiliary battery.

2. The electric vehicle charging system of claim 1, wherein:
   the controller increases the heater output as the charge amount of the auxiliary battery increases.

3. The electric vehicle charging system of claim 1, further comprising:
   an electrical component supplied with electric power from the auxiliary battery,
   wherein the controller determines operation or non-operation of the electrical component according to the charge amount of the auxiliary battery.

4. The electric vehicle charging system of claim 3, wherein the controller allows operation of the electrical component when the charge amount of the auxiliary battery is a predetermined charge amount or greater, and prohibits operation of the electrical component when the charge amount of the auxiliary battery is lower than the predetermined charge amount.

5. The electric vehicle charging system of claim 3, wherein the controller determines whether to conduct or stop electricity to the heater, and also determines operation or non-operation of the electrical component, according to the temperature of the drive battery.

6. The electric vehicle charging system of claim 5, wherein the controller
   conducts electricity to the heater and prohibits operation of the electrical component when the temperature of the drive battery is lower than a first predetermined temperature,
   conducts electricity to the heater and allows operation of the electrical component when the temperature of the drive battery is the first predetermined temperature or greater and lower than a second predetermined temperature which is higher than the first predetermined temperature, and
   stops the heater and allows operation of the electrical component when the temperature of the drive battery is the second predetermined temperature or greater.

* * * * *